US006763428B1

(12) United States Patent
Cappon

(10) Patent No.: US 6,763,428 B1
(45) Date of Patent: Jul. 13, 2004

(54) METHODS AND SYSTEMS FOR PERFORMING PUSH-PULL OPTIMIZATION OF FILES WHILE FILE STORAGE ALLOCATIONS ARE ACTIVELY CHANGING

(75) Inventor: Andrew Cappon, Huntington Beach, CA (US)

(73) Assignee: Symantec Corporation, Cupertino, CA (US)

( * ) Notice: Subject to any disclaimer, the term of this patent is extended or adjusted under 35 U.S.C. 154(b) by 247 days.

(21) Appl. No.: 09/630,654

(22) Filed: Aug. 2, 2000

(51) Int. Cl.[7] .............................................. G06F 12/00
(52) U.S. Cl. ........................ 711/112; 711/4; 711/170; 711/171; 711/137; 707/205; 707/206; 369/13.01; 369/13.09; 369/13.04; 360/47; 360/48
(58) Field of Search ............................. 711/4, 170, 171, 711/137; 369/13.01, 13.09, 13.14, 13.56; 360/48, 47; 707/205, 206

(56) References Cited

U.S. PATENT DOCUMENTS

| | | | | | |
|---|---|---|---|---|---|
| 4,771,375 | A | * | 9/1988 | Beglin et al. ................ | 711/111 |
| 5,423,015 | A | * | 6/1995 | Chung ......................... | 707/100 |
| 5,778,392 | A | * | 7/1998 | Stockman et al. .......... | 707/205 |
| 5,873,118 | A | | 2/1999 | Letwin ........................ | 711/156 |
| 5,897,661 | A | * | 4/1999 | Baranovsky et al. ........ | 707/205 |
| 5,930,828 | A | * | 7/1999 | Jensen et al. ................ | 360/48 |
| 5,956,745 | A | * | 9/1999 | Bradford et al. ............ | 711/137 |
| 6,070,172 | A | * | 5/2000 | Lowe .......................... | 707/205 |
| 6,151,666 | A | * | 11/2000 | Blendermann et al. ..... | 711/170 |
| 6,182,089 | B1 | * | 1/2001 | Ganapathy et al. ......... | 707/206 |
| 6,189,081 | B1 | * | 2/2001 | Fujio .......................... | 709/104 |
| 6,202,121 | B1 | | 3/2001 | Walsh ......................... | 711/100 |
| 6,240,527 | B1 | | 5/2001 | Schneider ................... | 714/21 |
| 6,397,311 | B1 | * | 5/2002 | Capps .......................... | 709/1 |

* cited by examiner

Primary Examiner—Matthew Kim
Assistant Examiner—Zhuo H. Li
(74) Attorney, Agent, or Firm—Fliesler Meyer LLP

(57) ABSTRACT

A method for performing full optimization of most of the files on a volume in accordance with a composed optimization plan, is performed, including the separation of less frequently accessed files from those whose number or location of clusters is being more frequently modified by user applications. Optimization does not continue indefinitely—it reaches a final state even if a small percentage of its file data is still out of place under the optimization plan and therefore not in the planned part of a plan-defined, Placed Files Area. Each time a Push of out-of-place file data is attempted, or a Pull of file data into a correspondingly planned free space within the Placed Files Area is attempted, a copy of the current volume bitmap is made in order to determine what is the largest free space currently available in the Placed Files Area. Once determined, the size of the largest free space is compared to the size of the largest out-of-place range of corresponding clusters in the Placed Files Area. If the size of the largest free space is greater than or equal to the size of the largest out-of-place range in the Placed Files Area, then a Pull operation is attempted. If any part of the Pull operation fails, then the method updates local data structures for tracking the range of affected clusters. If the method determines that the attempted Pull operation failed because of a problem with the source data, then the leftover pullable free space is disabled from further Pull attempts. If the largest free space is smaller than the largest out-of-place range, then a Push operation is attempted for pushing the out-of-place range of clusters to a scratch area. If any part of the Push operation fails, the local data structures are updated for the range of affected clusters. Regardless of whether or not the Push operation succeeds or fails, the out-of-place range is removed from further consideration for a Push.

38 Claims, 4 Drawing Sheets

METHODS AND SYSTEMS FOR PERFORMING PUSH-PULL OPTIMIZATION OF FILES WHILE FILE STORAGE ALLOCATIONS ARE ACTIVELY CHANGING

BACKGROUND OF THE INVENTION

1. Field of the Invention

The present invention pertains to optimization of a disk volume while user applications are actively changing file allocations by creating, deleting, extending, truncating, renaming, and/or copying over files on the volume.

2. Discussion of the Related Art

Some conventional disk defragmenters such as Symantec's SpeedDisk™ 4.0 for Windows NT (where the 4.0 version employs the Opportunistic Tile-Pull method of Stockman U.S. Pat. No. 5,778,392) and such as Executive Software's Diskeeper appear to tolerate user activity on the volume while the defragmenters are trying to perform optimization, but they do not fully optimize the disk. They appear to only defragment some files and push them to the front of the volume.

Other conventional disk optimizers (such as Symantec's SpeedDisk™ for Windows 95/98 and McAfee's DiskTune) do a full optimization using proprietary Push-Pull algorithms, but if any user activity occurs on the volume during such optimization, these conventional optimizers restart the optimization. On a busy server this constant restarting prevents optimization from making any progress at all.

Still other conventional disk optimizers (such as Raxco's PerfectDisk NT) appear to behave somewhere in the middle—they go a little more toward completing optimization of the disk despite interruptive user modifications to files, but the implementation is much closer to Diskeeper than it is to a Push-Pull algorithm. This Diskeeper-like conventional optimizer pushes less frequently accessed files away from the center and places more volatile files there instead. This is a relatively unsophisticated approach compared to the Push-Pull algorithm, and the approach leaves behind many small free spaces instead of coagulating them into one large scratch area. PerfectDisk appears to tolerate interruptive user activity but it makes very slow, if any, progress if the interruptive user activity is continuous.

One of the features of Executive Software's Diskeeper that frustrates users the most is that they have to do a lengthy defragmentation while repeatedly rebooting their machines if they want to defragment directories, the Paging file or the MFT, (a very large system file similar in function to the FAT in the FAT32 file system).

As is apparent from the above discussion, a need exists for a disk optimizer which can efficiently perform a sophisticated Push-Pull optimization even during periods when interruptive user activity is heavy and overlappingly makes changes to file storage allocations.

SUMMARY OF THE INVENTION

Disk optimization requires a substantial amount of time to execute, often on the order of hours for large disks. Conventional disk optimization algorithms restart each time a user modification to the storage allocations on the volume being optimized occurs. For computers running their own operating systems, multiple applications, and/or serving as server computers in a network, conventional algorithms therefore render disk optimization nearly impossible while the computer is performing its normal duties, because the optimization process restarts each time modifications to the storage allocations of the volume are made during the optimization process.

An object of this invention is to allow full optimization of most of the files on a volume, including the separation of less frequently accessed files from those being modified more frequently by user applications. In comparison to conventional approaches under the same level of modification stress, the methods according to the present invention do a much more complete optimization in a relative fraction of the time. Not only does the present invention allow moving of system files by the user without requiring the user to reboot each time, the present invention allows a much more complete push-pull style optimization to be performed while the user is getting serious production use out of the server.

According to the present invention, optimization does not continue indefinitely—it reaches a final state with a small percentage of its file data still out of place from what is specified in its optimization plan or goal map. A second run at this point will go much faster than the first because most of the files are already optimized according to the first goal map, and the optimizer then has a better chance of reaching a condition of full optimization with the second run.

During the sorting phase of the disk optimization, an optimization 'plan' or 'goal map' is composed which specifies the desired placement of all of the files on the disk. The placed files region of a disk is the area of the disk that, according to the plan composed during the sorting phase, will contain the file data at the end of the optimization run. According to the present invention, each time a push of out-of-place clusters is attempted, or a pull into free space is attempted, a copy of the volume bitmap is made in order to determine what free space is currently available in the placed files area.

Once determined, the size of the currently largest free space is calculated and compared to the size of that span of storage allocations in the placed files area that constitutes the largest out-of-place span that is to be moved according to plan into corresponding free space in the placed files area. If the size of the currently largest free space is greater than or equal to the size of the largest out-of-place and corresponding span, then a pull-into-free space operation is attempted. In other words, an attempt to move the data of the largest out-of-place span into the corresponding largest free space is performed. If any part of the attempted, pull-into-free operation fails (because a free space, F, has suddenly become occupied, or because a data-containing cluster, N, has suddenly been erased or overwritten), then the method updates local data structures to indicate the failed part of the range of affected clusters. If for example, the method determines that the attempted pull operation failed because of a problem with the source data, then the leftover pullable-into free space is disabled from being considered for further pull attempts of the run. This occurs, for example, if the source data no longer exists due to interceding user modification prior to the time the pull is attempted.

According to another aspect of the present invention, if the largest free space is smaller than the largest out-of-place range, then a push operation is attempted. A push operation is an operation that moves out-of-place clusters to the scratch area. If any part of the push operation fails, the local data structures are updated for the range of affected clusters. Regardless of whether or not the push operation succeeds or fails, the out-of-place range is removed from further consideration for a push.

The present invention keeps track of the current locations of file data, and the locations of free spaces on the disk in data structures with the assumption that user activity can make any of them stale, and thus out of date at any time during the optimization process. The algorithm proceeds optimistically assuming that no user activity has occurred. If this assumption proves wrong, the result is a failed move. Tracking data is updated for the range of clusters involved in the failed move and then the algorithm moves on to try and complete remaining ones of its optimization goals that still remain viable.

These and other features, aspects, and advantages of the present invention will be apparent from the Detailed Description of the Invention which discusses the Figures, in which like parts are referred to with like reference numerals.

Figure 1:
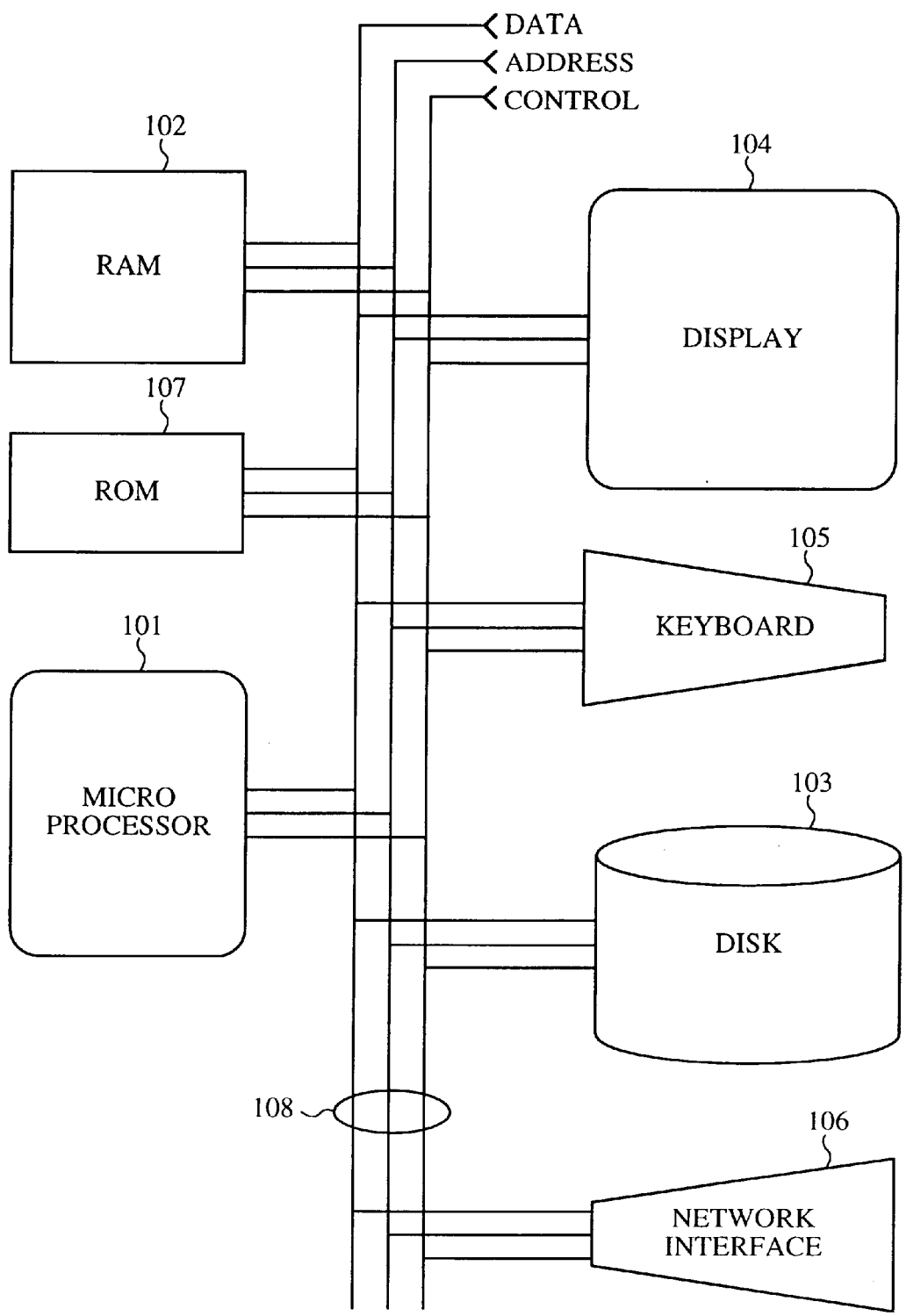
FIG. 1 illustrates a general purpose computer architecture suitable for running the disk optimization method according to the present invention.

The Figures are more fully described in the Detailed Description of the Invention.

DETAILED DESCRIPTION OF THE INVENTION

Disk optimization requires a substantial amount of time to execute, often on the order of hours for large disks. Conventional disk optimization algorithms restart each time a user modification to the volume being optimized occurs. For computers running their own operating systems, multiple applications, and/or serving as server computers in a network, conventional algorithms therefore render disk optimization nearly impossible while the computer is performing its normal duties, because the optimization process restarts each time the volume is modified by user activity during the optimization process.

The present invention allows full optimization of most of the files on a volume, including the separation of less frequently accessed files from those being modified more frequently by user applications. In comparison to conventional approaches under the same level of user production stress, the methods according to the present invention do a much more complete optimization in a relative fraction of the time. Not only does the present invention allow movement of system files without requiring the user to reboot, the present invention allows a much more complete push-pull style optimization to be performed while the user is getting serious production use out of the server.

According to the present invention, optimization does not continue indefinitely—it reaches a final state even if a small percentage of its file data is still out of place (not in place per the pre-composed optimization plan). A second run at this point will go much faster than the first because most of the files are already optimized, and has a better chance of reaching a condition of full optimization.

If during optimization, a file is deleted or becomes shorter, the "pull" into the free space areas is disabled for the free space areas of the volume for which no corresponding file data exists anymore. Likewise when a "push" is attempted on earlier-filled areas of files that no longer exist, these invalid areas are deleted from being considered as out-of-place areas. "Pull" operations are only attempted into free space areas that are currently designated as being actually free in the current version of the volume bitmap. This allows for possible creation or extension of files during optimization, where the extension or creation consumes free space. Out-of-place sections of files that can't be pulled into a corresponding free space because something is in the way will eventually get pushed out into the scratch area, where they will remain at the conclusion of the run.

The final state is reached when there are no Pull-able-into (correctly fillable, per plan) free spaces or out-of-place, pushable areas left in the areas of the volume for which placement was planned.

Optionally, the method of the present invention is able to recommend a "clean-up" optimization if any allocated space remains out-of-place in what should be the scratch area at the end of an optimization. This optional clean-up optimization is often a very short run as most of the files are already optimized.

FIG. 1 illustrates a general purpose computer system 100 suitable for running a disk optimization method according to the present invention. The suitable computer system 100 includes at least a microprocessor 101, Random Access Memory (RAM) 102, and a hard disk 103. The system also optionally includes a display 104, a user input device (keyboard 105 or mouse), a network interface 106, Read-Only Memory (ROM) 107, and Non-Volatile Random Access Memory (NVRAM) 104. The hard disk 103 and ROM 107 provide permanent storage capability for various purposes on the general purpose computer system 100. In order to communicate with other computing devices, the general purpose computer 100 may use the network interface 106. As illustrated in FIG. 1, all of these elements are connected to a common data bus 108 having data, address, and control data paths.

Although the general purpose computer 100 illustrated in FIG. 1 includes a single data bus 108, there is no requirement that this be the case. For example, the microprocessor 101 may alternatively be connected to multiple data buses which interface various subsets of the general purpose computer elements to each other. For example, the microprocessor 101 and RAM 102 may be connected by a single data bus; while the ROM 107 and hard disk 103 are connected to a second data bus that also interfaces with the microprocessor 101 indirectly. Similarly, the network interface 106 and keyboard 105 may also be connected to each other via a third data bus which is indirectly connected to the microprocessor 101. Similarly, the display 105 may be connected to the microprocessor 101 indirectly through a separate data bus. As described above, it is to be understood that a general purpose computer 100 suitable for implementing the methods according to the present invention may take a variety of forms.

It is further to be understood that a computer readable storage medium may be provided in accordance with the invention having computer readable program code embod ied thereon for causing a computer to perform a method for optimizing a volume of allocated storage regions in accordance with teachings provided herein.

It is further to be understood that a computer system comprising a processor and a processor readable storage medium may be provided in accordance with the invention where the processor readable storage medium has embodied thereon, processor readable program code for causing the computer system to perform a method for optimizing a volume of allocated storage regions in accordance with teachings provided herein.

A conventional Push-Pull disk optimization algorithm allows user modification of file contents as long as the contents modification doesn't change the location of the file data on the volume. However, the following scenarios will cause conventional implementations of Push-Pull to restart:

1) Files that grow or shrink in terms of number of storage allocation units (e.g., clusters) assigned to them;
2) Files that are created or deleted; and
3) Files that move to a new location on the volume.

For example, if during a conventional Push-Pull run, a user additionally causes a file to move by using the Microsoft MoveFile API, (e.g., the user runs a defragmentation utility while running a conventional Push-Pull product at the same time), the conventional Push-Pull run will respond to the file move by restarting.

As another example, it is possible to have files which shrink and grow again during a conventional Push-Pull run so that file data which was originally thought to occupy a certain location is now located at a different location. Such relocation may be considered the same as a MoveFile as far as the Push-Pull run is concerned and that will conventionally trigger a restart.

Sample optimizations which encounter and overcome these three problematic scenarios in accordance with the invention are fully described herein.

First, however, there are provided some overviews and definitions of terms to be used in the program flow descriptions of compensating algorithms according to the present invention.

The Placed Files Region is the area of the disk that, according to the optimization plan or goal map which is composed during the sorting phase, should contain the optimally-placed file data at the end of the optimization run.

The Scratch Area is all areas of the disk other than the 'Placed Files Region'. In other words, planned free space.

Out-Of-Place Clusters are file data that are not currently located where the optimization plan (goal map) intends such clusters to be by the end of the optimization run.

A Push operation is an operation that moves one or more Out-Of-Place clusters to the Scratch area.

A Pull operation is an operation that moves file data from anywhere on the volume to its planned, and currently free, location.

The Volume Bitmap is maintained by Windows NT. It maintains an up to date bitmap indicating the locations of all free clusters on the volume.

A Free Space is a contiguous range or span of free clusters.

A Push-Pull algorithm takes place in three phases: (1) Scanning, (2) Sorting, and (3) Optimization.

During the scanning phase (Phase 1), all files presently on the disk are scanned to build a database describing the current location of each file's data, the total size of that data, and a classification for the file, (Infrequently accessed, Frequently modified, System files, Directories, etc.) If during the Push-Pull run, new files are created after this scanning phase, such newly-created files will show up as occupied (nonfree) clusters in the Volume bitmap, but they will not be movable due to the lack of scanning data which is required by the Push-Pull algorithm and normally gathered during this phase.

During the sorting phase (Phase 2), using the data from the previous phase, a goal map or plan for the placement of all of the scanned files on the disk is composed.

During the optimization phase (Phase 3) according to the present invention, file data is moved in an effort to make the actual state of the volume approximately match the plan from the previous phase. This phase contains the enhancements relating to the invention, so a more detailed description of the flow of processing in this phase follows.

The Program flow during a Phase 3 optimization according to the present invention is described below in pseudocode.

```
Do until no (Pullable-into Free Spaces OR Pushable Out-Of-Place
Clusters) in the Placed Files Area
    Make a copy of the current Volume Bitmap
    Mask out Free Space areas not to be considered for a Pull
    into them
    Use masked copy of Volume Bitmap to find the Largest Free
    Space in the Placed Files Region
    Examine Out-Of-Place map and locate the largest Out-Of-Place
    range of clusters in the Placed Files Area
    If size of Largest Free Space >= Largest Out-Of-Place range
    of clusters in the Placed Files Area
        Do Pull into-Free-Space Operation
        If any part of the Pull fails
            Update local data structures for the range of
            affected clusters
            If Pull failed because of problem with source
            data, (e.g. it no longer exists)
                Disable the leftover pullable Free
                Space(s) from further Pull attempts
            Endif
        Endif
    Else
        Do Push out-of-place-clusters Operation
        If any part of the Push fails
            Update local data structures for the range of
            affected clusters
        Endif
        Remove failed Out-Of-Place range from further
        consideration for a Push
    Endif
Enddo
```

The present invention keeps track of the current locations of file data, and the locations of free spaces on the disk in data structures with the assumption that user activity can make optimization plans for any of them 'stale' (out of date), at any given point in processing. The algorithm according to the present invention proceeds optimistically assuming that no user activity has occurred. If this assumption proves wrong the result will be failed move operations. The algorithm according to the present invention responds to failed moves by updating the tracking data it has for the range of clusters involved and then it moves on to try and complete those of its goals that still remain viable.

Notation used for the following sections describing sample optimizations:

As an example, a volume of 16 clusters in length could be represented according to the following key:

Actual Locations, Legend-A

"1" represents a cluster belonging to File #1;

"2" represents a cluster belonging to File #2;

"3" represents a cluster belonging to File #3; and

"F" represents a cluster belonging to Free Space.

Cluster positions 1–16 are respectively denoted by lower case letters a–p.

The Initial State of the 16-cluster volume is therefore as follows:

A view of the volume as seen from the algorithm is now shown at each step of the following sample optimizations.

INITIAL STATE

| Position | a | b | c | d | e | f | g | h | i | j | k | l | m | n | o | p |
|---|---|---|---|---|---|---|---|---|---|---|---|---|---|---|---|---|
| Data Belongs to File#: | 1 | 1 | 2 | F | 2 | 2 | 3 | 1 | 3 | F | F | F | 2 | 2 | F | F |

|___|_____|--File #1

At the end of the Scanning phase, a data structure exists describing the file data as it sits:

File #1 is 3 clusters long and is in 2 parts, one part being in range a–b and the other in position h;

File #2 is 5 clusters long and is in 3 parts, the parts being at respective positions c, e–f, m–n;

File #3 is 2 clusters long and is in 2 parts; and

There are 6 free clusters distributed in three free space ranges, namely, d, j–l, and o–p.

At the end of the Sorting phase, a plan exists for how the method according to the present invention would like the volume to be at the end of optimization:

Note that parts of this view may often not reflect the actual state of the volume. This invention takes into account the possibility that any information it collects during scanning with respect to location of free spaces, and/or of file data may become 'stale' (out of date), before the information can be used. This view can be interpreted with the following key:

Algorithm View: Legend-C

'P' indicates Pullable-into Free Space;

'S' indicates Free Space available for scratch;

1,2,3 indicates clusters of File #1, #2, and #3, respectively;

PLAN

| Position | a | b | c | d | e | f | g | h | i | j | k | l | m | n | o | p |
|---|---|---|---|---|---|---|---|---|---|---|---|---|---|---|---|---|
| Data Belongs to File#: | 1 | 1 | 1 | 2 | 2 | 2 | 2 | 2 | 3 | 3 | F | F | F | F | F | F |

|___|____|____|____|____|--File #2

File #1 will be 3 contiguous clusters long and will start at the first cluster position, a;

File #2 will be 5 contiguous clusters long and will start at the fourth cluster position, d; and File #3 will occupy the ninth and tenth cluster positions, i–j.

Storage space from the eleventh cluster on is planned for containing free space and such free spaces are usable as a scratch area.

A bitmap mask is applied to a copy of the Volume Bitmap according to the present invention to help classify free spaces as 'Pullable-into' (P) or as 'Scratch' (S). Entries in the bitmap mask may be used to disable the pulling of corresponding data into a pullable-into free space when such corresponding data ceases to exist. The Bitmap Mask key follows:

Bitmap Mask, Legend-B

Lower case 'z' indicates a Volume portion outside the Placed Files Area. Free spaces here can be used for scratch.

Upper case 'X' indicates Free Space that has been disabled from participating in Pull attempts by the features of this invention.

'=' indicates Don't care. The region was previously free space but is now occupied by something which could be of unknown nature if due to interceding user activity. Because it does not care what the nature is, the here-enhanced Push-Pull Algorithm will not initiate either a Push or a Pull for this Don't Care (=) region. Another P region could however pull-in the material of this= region as will be seen below.

The Out-Of-Place cluster map (OOP map) is another component of the algorithm's view of the volume. This data is obtained by comparing the planned placement (PLAN) with the current positionings of data or free space, according to the following key:

Oop Map: Legend-D

'+' (PLUS) indicates file data that is already In-Place;

'–' (MINUS) indicates file data that is still Out-Of-Place; and

'=' (NEITHER) indicates a Don't care situation. For example, this can indicate either Free space anywhere, or data clusters that are outside the Placed Files Area and thus by definition, cannot be considered out-of-place within the Placed Files Area.

The following is a first sample Optimization carried out according to the present invention and showing effects of files that grow or shrink over time, where t=0 is the initial state:

Initial State, including map of Out-Of-Place clusters:

ALGORITHM VIEWS AT INITIAL STATE (0)

| Position | a | b | c | d | e | f | g | h | i | j | k | l | m | n | o | p |
|---|---|---|---|---|---|---|---|---|---|---|---|---|---|---|---|---|
| Actual (0): | 1 | 1 | 2 | F | 2 | 2 | 3 | 1 | 3 | F | F | F | 2 | 2 | F | F |
| Bitmap Mask(0) | = | = | = | = | = | = | = | = | = | = | z | z | z | z | z | z |
| Alg. View (0) | 1 | 1 | 2 | P | 2 | 2 | 3 | 1 | 3 | P | S | S | = | = | S | S |
| OOP Map (0) | + | + | - | = | + | + |   |   | + | = | = | = | = | = | = | = |
| Goal Map (PLAN) | 1 | 1 | 1 | 2 | 2 | 2 | 2 | 2 | 3 | 3 | F | F | F | F | F | F |

The Actual(0) row represents the initial file placement in the corresponding Windows NT structures, including the current Volume Bitmap.

The illustrated Bitmap Mask(0) is applied to the current copy of the Volume Bitmap so as to disable (due to the z's)

Pull-ins of file data into free spaces located outside the Placed Files Area.

The illustrated initial OOP Map(0) indicates how in-place and out-of-place 15 cluster placements are seen by the algorithm in light of the masked bitmap copy and in light of the contiguous file runlists.

The Goal Map or 'PLAN' is the intended state after optimization completes.

At the start of the moving phase, the first operation in the enhanced algorithm is to find and Push out to Scratch, the largest out-of-place range of clusters in the placed files area. As seen in the OOP Map(0) of the initial STATE(0), this will be the two contiguous minus signs (--) at positions g and h (1 cluster each from files #3 and #1).

After the 2 cluster Push is carried out, the next state (STATE-1) of the system will be as follows:

EXAMPLE 1 AT FIRST ALTERED STATE (1)

| Position | a | b | c | d | e | f | g | h | i | j | k | l | m | n | o | p |
|---|---|---|---|---|---|---|---|---|---|---|---|---|---|---|---|---|
| Actual (1): | 1 | 1 | 2 | F | 2 | 2 | F | F | 3 | F | 3 | 1 | 2 | 2 | F | F |
| Bitmap Mask(1) | = | = | = | = | = | = | = | = | = | = | z | z | z | z | z | z |
| Alg. View (1) | 1 | 1 | 2 | P | 2 | 2 | P | P | 3 | P | = | = | = | = | S | S |
| OOP Map (1) | + | + | - | = | + | + | = | = | + | = | = | = | = | = | = | = |
| Goal Map (PLAN) | 1 | 1 | 1 | 2 | 2 | 2 | 2 | 2 | 3 | 3 | F | F | F | F | F | F | v__v           ^__^

In the algorithm views shown for first altered STATE(1), changes have occurred at columns g and h for the Actual(1) row, the Alg. View(1) row and the OOP Map(1) row because of the Push out of the largest contiguous span of out-of-place (--) of clusters. Changes due to the first Push have also occurred at columns k and 1 for the Actual(1) row, and the Alg. View (1) row. This data movement is further represented by the downward-pointing 'V' symbols and up-pointing '^' symbols provided under the table structure of STATE(1). Extra underlining is provided in the table boxes whose contents have changed to highlight those changes.

Assume that before the start of the next operation, user activity makes File #3 one cluster longer (by inserting new data at open position d), and user activity makes File #2 become one cluster shorter (by erasing data at position n).

After such interceding User Activity is carried out, but before the enhanced Push-Pull algorithm detects and acts on the changes, the next STATE (2) of the system will be as follows:

The Algorithm View for this cluster position d is next changed to be marked as a 'Don't Care', (shown as '='), because in the view of the algorithm there is no reason to either Push or Pull it. The cluster will remain as it is for the

SECOND ALTERED STATE (2)

| Position | a | b | c | d | e | f | g | h | i | j | k | l | m | n | o | p |
|---|---|---|---|---|---|---|---|---|---|---|---|---|---|---|---|---|
| Actual (2): | 1 | 1 | 2 | | 2 | 2 | F | F | 3 | F | 3 | 1 | 2 | | F | F |
| Bitmap Mask(2) | = | = | = | = | = | = | = | = | = | = | z | z | z | z | z | z |
| Alg. View (2) | 1 | 1 | 2 | P | 2 | 2 | P | P | 3 | P | = | = | = | = | S | S |
| OOP Map (2) | + | + | - | = | + | + | = | = | + | = | = | = | = | = | = | = |
| Goal Map (PLAN) | 1 | 1 | 1 | 2 | 2 | 2 | 2 | 2 | 3 | 3 | F | F | F | F | F | F |

At the start of the next operation by the enhanced Push-Pull algorithm, the algorithm's copy of the volume bitmap is refreshed from the system Volume Bitmap, (and the mask is applied). One of the pullable-into free spaces (P) that existed in STATE(1) is now seen by the algorithm to have disappeared, namely, the $4^{th}$ cluster from the left, in position d. Regardless of whether this user-modified cluster is a cluster from a known file, (e.g., FILE #3), or a newly created file (e.g., FILE #4) that the method knows nothing about, the data of this modified cluster at position d will not be allowed to move during this optimization run for two reasons. First of all, there is no longer a free space (F) there so no Pull-into that position d will be attempted. Secondly, there was no Out-of-Place indication there (no MINUS in column d of OOP Map(2)) so no Push-out to Scratch will be attempted.

duration of the run. Accordingly the PLAN for position 'd' will not be realized in this run and that part of the plan is effectively X'd out because of the don't care (=) inserted into column d of the below Alg. View(3). To aid the reader in understanding this, an 'x' is shown in the affected part of the unchanged goal map.

After its updating by the enhanced Push-Pull algorithm in light of the revised local copy of the bitmap, the algorithm view at this third state is as follows (note the new S designation in column n which arises from the new free space (F) found there because the last cluster of FILE#2 was erased):

ALGORITHM VIEWS AT THIRD ALTERED STATE (3)

| Position | a | b | c | d | e | f | g | h | i | j | k | l | m | n | o | p |
|---|---|---|---|---|---|---|---|---|---|---|---|---|---|---|---|---|
| Actual (3): | 1 | 1 | 2 | | 2 | 2 | F | F | 3 | F | 3 | 1 | 2 | | F | F |
| Bitmap Mask(3) | = | = | = | = | = | = | = | = | = | = | z | z | z | z | z | z |
| Alg. View (3) | 1 | 1 | 2 | | 2 | 2 | P | P | 3 | P | = | = | = | | S | S |
| OOP Map (3) | + | + | - | = | + | + | = | = | + | = | = | = | = | = | = | = |
| Goal Map (PLAN) | 1 | 1 | 1 | 2 x | 2 | 2 | 2 | 2 | 3 | 3 | F | F | F | F | F | F |

The next operation by the enhanced Push-Pull algorithm will be to try to move from Scratch, the initially-in-Scratch parts of File #2 where this next move is to be a Pull into Pull-able free spaces in the planned placement area for File #2.

Note however, that the last cluster of File #2 which sat in Scratch column 'n' during STATE(1) will fail to move because that cluster no longer exists in STATE(2) and STATE(3) due to the interceding shortening of the file after STATE(1). Because ofthis change of circumstances, the enhanced Push-Pull algorithm will alter its view of the free space (F/h) located at the end of the planned placement for FILE #2 and it will re-designate that position 'h' as being masked, or disabled ('X') from future Pull attempts so that according to the present invention the algorithm can continue with other optimization tasks rather than being endlessly trapped in a condition of looping infinitely and trying to move the non-existent last cluster of shortened FILE#2 from position 'n' into planned place 'h'. (Because of this masking, X, the plan for position 'h' will not be realized in this run).

It is assumed for next STATE(4) that the '2' data that was initially in position 'm' was Pulled successfully into planned position g and that thereafter, the next out-of-place '2' data was successfully Pushed out from position c and into the temporarily free (*) position 'm' thereby creating the following STATE(4).

ALGORITHM VIEWS AT FOURTH ALTERED STATE (4)

| Position | a | b | c | d | e | f | g | h | i | j | k | l | m | n | o | p |
|---|---|---|---|---|---|---|---|---|---|---|---|---|---|---|---|---|
| Actual (4): | 1 | 1 |  | 3 | 2 | 2 |  |  | 3 | F | 3 | 1 |  | F | F | F |
| Bitmap Mask(4) | = | = |  | = | = | = |  | X | = | = | z | z | z | z | z | z |
| Alg. View (4) | 1 | 1 |  | = | 2 | 2 |  |  | 3 | P | = | = | = | S | S | S |
| OOP Map (4) | + | + |  | = | + | + |  |  | + | = | = | = | = | = | = | = |
| Goal Map (PLAN) | 1 | 1 | 1 | 2 | 2 | 2 | 2 |  | 3 | 3 | F | F | F | F | F | F |

V_____^

The algorithm according to the present invention carries out a few more small Pulls to finish this optimization run and to thereby maximize the number of pluses (+) in following OOP Maps(5) and (6):

ALGORITHM VIEWS AT FIFTH ALTERED STATE (5)

| Position | a | b | c | d | e | f | g | h | i | j | k | l | m | n | o | p |
|---|---|---|---|---|---|---|---|---|---|---|---|---|---|---|---|---|
| Actual (5): | 1 | 1 |  | 3 | 2 | 2 | 2 | F | 3 | F | 3 |  | 2* | F | F | F |
| Bitmap Mask(5) | = | = |  | = | = | = | = | X | = | = | z |  | z | z | z | z |
| Alg. View (5) | 1 | 1 |  | = | 2 | 2 | 2 | = | 3 | P | = |  | = | S | S | S |
| OOP Map (5) | + | + |  | = | + | + | + | = | + | = | = |  | = | = | = | = |
| Goal Map (PLAN) | 1 | 1 | 1 |  | 2 | 2 | 2 |  | 3 | 3 | F | F | F | F | F | F |

^_____V

ALGORITHM VIEWS AT SIXTH ALTERED STATE (6)

| Position | a | b | c | d | e | f | g | h | i | j | k | l | m | n | o | p |
|---|---|---|---|---|---|---|---|---|---|---|---|---|---|---|---|---|
| Actual (6): | 1 | 1 | 1 | 3 | 2 | 2 | 2 | F | 3 | 3 | F | F | 2* | F | F | F |
| Bitmap Mask(6) | = | = | = | = | = | = | = | X | = | = | z | z | z | z | z | z |
| Alg. View (6) | 1 | 1 | 1 | = | 2 | 2 | 2 | = | 3 | 3 | S | S | = | S | S | S |
| OOP Map (6) | + | + | + | = | + | + | + | = | + | = | = | = | = | = | = | = |
| Goal Map (PLAN) | 1 | 1 | 1 | 2 | 2 | 2 | 2 | 2 | 3 | 3 | F | F | F | F | F | F |

^__v

At the end of the above, first example of an optimization according to the invention, in STATE(6), there are two fragmented files, (FILE#2 and FILE #3), left as a result of the interceding user modifications to the volume, but the run was able to complete its defragmenting of FILE#1 without being forced to start over from the beginning as it would have conventionally had to do.

Next, a second sample optimization is illustrated to show the effects of whole files being deleted or created after completion of the scanning phase.

Suppose that the user starts from the same initial STATE (0) as before, completing the scanning and sorting phases without incident. Before any moves are attempted File #3 is deleted, and a new file is created. The newly interjected file (FILE#4) will be treated by our enhanced Push-Pull algorithm as being not movable because our algorithm has not gathered needed data about FILE#4 during the scanning process.

The Initial State(0') of example 2, which state occurs after the scanning and sorting phases, but before user-interjected modifications is shown below, followed by subsequent STATEs (1') and (2'). The upcoming intent to Push out-of-place items in columns g and h to scratch positions k and l is flagged ahead of time here for the reader's convenience.

SECOND EXAMPLE AT INITIAL STATE (0')

| Position | a | b | c | d | e | f | g | h | i | j | k | l | m | n | o | p |
|---|---|---|---|---|---|---|---|---|---|---|---|---|---|---|---|---|
| Actual (0): | 1 | 1 | 2 | F | 2 | 2 | 3 | 1 | 3 | F | F | F | 2 | 2 | F | F |
| Bitmap Mask(0) | = | = | = | = | = | = | = | = | = | = | z | z | z | z | z | z |
| Alg. View (0) | 1 | 1 | 2 | P | 2 | 2 | 3 | 1 | 3 | P | S | S | = | = | S | S |
| OOP Map (0) | + | + | - | = | + | + | | + | = | = | = | = | = | = | = | = |
| Goal Map (PLAN) | 1 | 1 | 1 | 2 | 2 | 2 | 2 | 2 | 3 | 3 | F | F | F | F | F | F | v v_____^__^

After the interceding user activity of deleting File #3 occurs, we have the following STATE(1'):

SECOND EXAMPLE AT POST-DELETE STATE (1')

| Position | a | b | c | d | e | f | g | h | i | j | k | l | m | n | o | p |
|---|---|---|---|---|---|---|---|---|---|---|---|---|---|---|---|---|
| Actual (1'): | 1 | 1 | 2 | F | 2 | 2 | F | 1 | F | F | F | F | 2 | 2 | F | F |
| Bitmap Mask(1') | = | = | = | = | = | = | = | = | = | = | z | z | z | z | z | z |
| Alg. View (1') | 1 | 1 | 2 | P | 2 | 2 | 3 | 1 | 3 | P | S | S | = | = | S | S |
| OOP Map (1') | + | + | - | = | + | + |   |   | + | = | = | = | = | = | = | = |
| Goal Map (PLAN) | 1 | 1 | 1 | 2 | 2 | 2 | 2 | 2 | 3 | 3 | F | F | F | F | F | F |

After creating new File #4 as two new clusters in positions g and j we have next STATE(2'):

SECOND EXAMPLE AT POST-CREATE STATE (2')

| Position | a | b | c | d | e | f | g | h | i | j | k | l | m | n | o | p |
|---|---|---|---|---|---|---|---|---|---|---|---|---|---|---|---|---|
| Actual (2'): | 1 | 1 | 2 | F | 2 | 2 | 4 | 1 | F | 4 | F | F | 2 | 2 | F | F |
| Bitmap Mask(2') | = | = | = | = | = | = | = | = | = | = | z | z | z | z | z | z |
| Alg. View (2') | 1 | 1 | 2 | P | 2 | 2 | 3 | 1 | 3 | P | S | S | = | = | S | S |
| OOP Map (2') | + | + | - | = | + | + |   |   | + | = | = | = | = | = | = | = |
| Goal Map (PLAN) | 1 | 1 | 1 | 2 | 2 | 2 | 2 | 2 | 3 | 3 | F | F | F | F | F | F |

As before, the first operation to be attempted by the enhanced Push-Pull algorithm in our second example will be a Push of the largest out of place range of clusters (--) in the placed files area, namely, moving from columns g and h, one cluster each respectively belonging, according to Alg. View (2') to FILE#3 and FILE#1. But unknown to the algorithm, File #3 no longer exists. When the attempt to move the column 'g' data of File #3 fails, the out-of-place designation (-) for that nonexistent File#3 cluster is removed from the Out-Of-Place Map so that corresponding position 'g' will not be considered for future Push operations in this run.

After updating its local copy of the bitmap, and partially updating the Alg. View for columns i and j the algorithm will see the following STATE(3')

SECOND EXAMPLE AT BITMAP UPDATE STATE (3′)

| Position | a | b | c | d | e | f | g | h | i | j | k | l | m | n | o | p |
|---|---|---|---|---|---|---|---|---|---|---|---|---|---|---|---|---|
| Actual (3′): | 1 | 1 | 2 | F | 2 | 2 | 4 | 1 | F | 4 | F | F | 2 | 2 | F | F |
| Bitmap Mask(3′) | = | = | = | = | = | = | = | = | = | = | z | z | z | z | z | z |
| Alg. View (3′) | 1 | 1 | 2 | P | 2 | 2 | 3 | 1 | P | = | S | S | = | = | S | S |
| OOP Map (3′) | + | + | - | = | + | + | = | = | + | = | = | = | = | = | = | = |
| Goal Map (PLAN) | 1 | 1 | 1 | 2 | 2 | 2 | 2 | 2 | 3 | 3 | F | F | F | F | F | F |

Attempted Move:  V__V          ^__^

After attempting the 2 cluster Push out from columns g and h, the algorithm produces the following STATE(4′):

SECOND EXAMPLE AT POST-PUSH STATE (4′)

| Position | a | b | c | d | e | f | g | h | i | j | k | l | m | n | o | p |
|---|---|---|---|---|---|---|---|---|---|---|---|---|---|---|---|---|
| Actual (4′): | 1 | 1 | 2 | F | 2 | 2 | 4 | F | F | 4 | F | 1 | 2 | 2 | F | F |
| Bitmap Mask(4′) | = | = | = | = | = | = | = | = | = | = | z | z | z | z | z | z |
| Alg. View (4′) | 1 | 1 | 2 | P | 2 | 2 | = | P | P | = | S | = | = | = | S | S |
| OOP Map (4′) | + | + | - | = | + | + | = | = | + | = | = | = | = | = | = | = |
| Goal Map (PLAN) | 1 | 1 | 1 | 2 | 2 | 2 | 2x | 2 | 3 | 3x | F | F | F | F | F | F | x__V          x__^

The next operation is to attempt a Pull into the free space area of column i (which area was initially occupied in STATE(0′) by a '+' cluster of File#3 that was already in its planned place but was removed when File#3 was deleted. The Pull will fail because the planned-for '3' cluster no longer exists and the column i space is disabled from future Pull attempts as indicated in next STATE(5′).

SECOND EXAMPLE AT POST-PULL ATTEMPT STATE (5′)

| Position | a | b | c | d | e | f | g | h | i | j | k | l | m | n | o | p |
|---|---|---|---|---|---|---|---|---|---|---|---|---|---|---|---|---|
| Actual (5′): | 1 | 1 | 2 | F | 2 | 2 | 4 | F | F | 4 | F | 1 | 2 | 2 | F | F |
| Bitmap Mask(5′) | = | = | = | = | = | = | = | = | X | = | z | z | z | z | z | z |
| Alg. View (5′) | 1 | 1 | 2 | P | 2 | 2 | = | P | = | = | S | = | = | = | S | S |
| OOP Map (5′) | + | + | - | = | + | + | = | = | = | = | = | = | = | = | = | = |
| Goal Map (PLAN) | 1 | 1 | 1 | 2 | 2 | 2 | 2x | 2 | 3x | 3x | F | F | F | F | F | F |

^_____...?

The optimization then proceeds through next STATEs (6')–(9') as shown without encountering further user modifications:

After a 1 cluster Push out of column 'c' we have the following STATE(6'):

SECOND EXAMPLE AT POST-PUSH STATE (6')

| Position | a | b | c | d | e | f | g | h | i | j | k | l | m | n | o | p |
|---|---|---|---|---|---|---|---|---|---|---|---|---|---|---|---|---|
| Actual (6'): | 1 | 1 | F | F | 2 | 2 | 4 | F | F | 4 | F | 1 | 2 | 2 | F | z |
| Bitmap Mask(6') | = | = | = | = | = | = | = | = | X | = | z | z | z | z | z | z |
| Alg. View (6') | 1 | 1 | F | P | 2 | 2 | = | P | = | = | S | = | = | = | S | = |
| OOP Map (6') | + | + | = | = | + | + | = | = | = | = | = | = | = | = | = | = |
| Goal Map (PLAN) | 1 | 1 | 1 | 2 | 2 | 2 | 2x | 2 | 3x | 3x | F | F | F | F | F | F |

V_____^

After a 1 cluster Pull into the now-freed column 'c', we have the following STATE(7'):

SECOND EXAMPLE AT POST-PULL STATE (7')

| Position | a | b | c | d | e | f | g | h | i | j | k | l | m | n | o | p |
|---|---|---|---|---|---|---|---|---|---|---|---|---|---|---|---|---|
| Actual (7'): | 1 | 1 | 1 | F | 2 | 2 | 4 | F | F | 4 | F | F | 2 | 2 | F | 2 |
| Bitmap Mask(7') | = | = | = | = | = | = | = | = | X | = | z | z | z | z | z | z |
| Alg. View (7') | 1 | 1 | 1 | P | 2 | 2 | = | P | = | = | S | S | = | = | S | = |
| OOP Map (7') | + | + | + | = | + | + | = | = | = | = | = | = | = | = | = | = |
| Goal Map (PLAN) | 1 | 1 | 1 | 2 | 2 | 2 | 2x | 2 | 3x | 3x | F | F | F | F | F | F |

^_____V

After a 1 cluster Pull into free column 'd', we have the following STATE(8'):

SECOND EXAMPLE AT POST-PULL STATE (8')

| Position | a | b | c | d | e | f | g | h | i | j | k | l | m | n | o | p |
|---|---|---|---|---|---|---|---|---|---|---|---|---|---|---|---|---|
| Actual (8'): | 1 | 1 | 1 | 2 | 2 | 2 | 4 | F | F | 4 | F | F | F | 2 | F | 2 |
| Bitmap Mask(8') | = | = | = | = | = | = | = | = | X | = | z | z | z | z | z | z |
| Alg. View (8') | 1 | 1 | 1 | 2 | 2 | 2 | = | P | = | = | S | S | S | = | S | = |
| OOP Map (8') | + | + | + | + | + | + | = | = | = | = | = | = | = | = | = | = |
| Goal Map (PLAN) | 1 | 1 | 1 | 2 | 2 | 2 | 2x | 2 | 3x | 3x | F | F | F | F | F | F |

^._____V

After a 1 cluster Pull into free column 'h' from 'n', we have the following STATE(9'):

SECOND EXAMPLE AT POST-PULL STATE (9')

| Position | a | b | c | d | e | f | g | h | i | j | k | l | m | n | o | p |
|---|---|---|---|---|---|---|---|---|---|---|---|---|---|---|---|---|
| Actual (9'): | 1 | 1 | 1 | 2 | 2 | 2 | 4 | 2 | F | 4 | F | F | F | F | F | 2 |
| Bitmap Mask(9') | = | = | = | = | = | = | = | = | X | = | z | z | z | z | z | z |
| Alg. View (9') | 1 | 1 | 1 | 2 | 2 | 2 | = | 2 | = | = | S | S | S | S | S | = |
| OOP Map (9') | + | + | + | + | + | + | = | + | = | = | = | = | = | = | = | = |
| Goal Map (PLAN) | 1 | 1 | 1 | 2 | 2 | 2 | 2x | 2 | 3x | 3x | F | F | F | F | F | F |

^._____V

Once again, this time in STATE(9') of example 2, there are two fragmented files, (#2 and #4), left as a result of the user activity, but the run was able to complete the defragmenting of FILE#1 according to PLAN without starting over from the beginning, as a conventional Push-Pull optimizer would have conventionally had to do without the benefits of the present invention.

A third sample optimization is now provided showing the effects of interceding user modifications causing files to move during the optimization. This can happen if the user runs a competitor's defragmentation utility while also running the Push-Pull optimization according to the present invention at the same time. If a file shrinks and grows again, then the newly created file data will be in a new location, which is the same thing as a move as far as the present algorithm is concerned.

The Initial State(0"), after scanning and sorting phase, but before user activity, is shown below.

THIRD EXAMPLE AT INITIAL STATE (0″)

| Position | a | b | c | d | e | f | g | h | i | j | k | l | m | n | o | p |
|---|---|---|---|---|---|---|---|---|---|---|---|---|---|---|---|---|
| Actual (0″): | 1 | 1 | 2 | F | 2 | 2 | 3 | 1 | 3 | F | F | F | 2 | 2 | F | F |
| Bitmap Mask(0″) | = | = | = | = | = | = | = | = | = | = | z | z | z | z | z | z |
| Alg. View (0″) | 1 | 1 | 2 | P | 2 | 2 | 3 | 1 | 3 | P | S | S | = | = | S | S |
| OOP Map (0″) | + | + | - | = | + | + |   |   | + | = | = | = | = | = | = | = |
| Goal Map (PLAN) | 1 | 1 | 1 | 2 | 2 | 2 | 2 | 2 | 3 | 3 | F | F | F | F | F | F |

Future Push:                  V V                ^  ^

After the competitor's defragmentation utility intercedingly moves File #3 clusters to Scratch, using the Microsoft MoveFile API, the following State(1″) exists.

THIRD EXAMPLE AT POST-MOVE STATE (1″)

| Position | a | b | c | d | e | f | g | h | i | j | k | l | m | n | o | p |
|---|---|---|---|---|---|---|---|---|---|---|---|---|---|---|---|---|
| Actual (1″): | 1 | 1 | 2 | F | 2 | 2 | F | 1 | F | F | F | F | 2 | 2 | 3 | 3 |
| Bitmap Mask(1″) | = | = | = | = | = | = | = | = | = | = | z | z | z | z | z | z |
| Alg. View (1″) | 1 | 1 | 2 | P | 2 | 2 | 3 | 1 | 3 | P | S | S | = | = | S | S |
| OOP Map (1″) | + | + | - | = | + | + |   | - | + | = | = | = | = | = | = | = |
| Goal Map (PLAN) | 1 | 1 | 1 | 2 | 2 | 2 | 2 | 2 | 3 | 3 | F | F | F | F | F | F |

V    V                ^  ^

After interceding user activity also shrinks File #1 from 3 clusters in length down to 1 cluster in length, the following State(2″) exists.

THIRD EXAMPLE AT POST-SHRINK STATE (2″)

| Position | a | b | c | d | e | f | g | h | i | j | k | l | m | n | o | p |
|---|---|---|---|---|---|---|---|---|---|---|---|---|---|---|---|---|
| Actual (2″): | 1 | F | 2 | F | 2 | 2 | F | F | F | F | F | F | 2 | 2 | 3 | 3 |
| Bitmap Mask(2″) | = | = | = | = | = | = | = | = | = | = | z | z | z | z | z | z |
| Alg. View (2″) | 1 | 1 | 2 | P | 2 | 2 | 3 | 1 | 3 | P | S | S | = | = | S | S |
| OOP Map (2″) | + | + | - | = | + | + | - | - | + | = | = | = | = | = | = | = |
| Goal Map (PLAN) | 1 | 1 | 1 | 2 | 2 | 2 | 2 | 2 | 3 | 3 | F | F | F | F | F | F |

After further-interceding user activity grows File #1 back to 3 clusters in length, the following State(3″) exists.

THIRD EXAMPLE AT POST-GROW STATE (3″)

| Position | a | b | c | d | e | f | g | h | i | j | k | l | m | n | o | p |
|---|---|---|---|---|---|---|---|---|---|---|---|---|---|---|---|---|
| Actual (3″): | 1 | F | 2 | F | 2 | 2 | F | F | F | 1 | 1 | F | 2 | 2 | 3 | 3 |
| Bitmap Mask(3″) | = | = | = | = | = | = | = | = | = | = | z | z | z | z | z | z |
| Alg. View (3″) | 1 | 1 | 2 | P | 2 | 2 | 3 | 1 | 3 | P | S | S | = | = | S | S |
| OOP Map (3″) | + | + | - | = | + | + | - | - | + | = | = | = | = | = | = | = |
| Goal Map (PLAN) | 1 | 1 | 1 | 2 | 2 | 2 | 2 | 2 | 3 | 3 | F | F | F | F | F | F |

For this third example, it is assumed that our enhanced Push-Pull algorithm updated its copy of the bitmap before all this user activity took place, so that one increment of the optimization will take place based on 'stale' bitmap data that does not yet reflect the user's changes. The algorithm according to the present invention will first attempt the 2 cluster Push out of columns g and h, as in the earlier examples, but neither Push attempt will succeed because the file data of respective Files #3 and #1 that was to be moved is no longer there. The algorithm updates its internal data structures for the range of affected clusters, and will fully update the copy of the bitmap on the next iteration as indicated in illustrated STATE(4″).

After attempting the 2 cluster Push out of columns g–h in our third example, the following State(4″) exists:

THIRD EXAMPLE AT POST-PUSH ATTEMPT STATE (4")

| Position | a | b | c | d | e | f | g | h | i | j | k | l | m | n | o | p |
|---|---|---|---|---|---|---|---|---|---|---|---|---|---|---|---|---|
| Actual (4"): | 1 | F | 2 | F | 2 | 2 | F | F | F | 1 | 1 | F | 2 | 2 | 3 | 3 |
| Bitmap Mask(4") | = | = | = | = | = | = | = | = | = | = | z | z | z | z | z | z |
| Alg. View (4") | 1 | 1 | 2 | P | 2 | 2 | P | P | 3 | P | S | S | = | = | S | S |
| OOP Map (4") | + | + | - | = | + | + | = | = | + | = | = | = | = | = | = | = |
| Goal Map (PLAN) | 1 | 1 | 1 | 2 | 2 | 2 | 2 | 2 | 3 | 3 | F | F | F | F | F | F |

$\qquad\qquad\qquad\qquad$ V V $\qquad\qquad\qquad$ ^ ^

After a fresh copy and full bitmap update at the start of the next iteration, the following State(5") exists {and U's are placed under the table to highlight the updated columns}:

THIRD EXAMPLE AT POST-UPDATE STATE (5")

| Position | a | b | c | d | e | f | g | h | i | j | k | l | m | n | o | p |
|---|---|---|---|---|---|---|---|---|---|---|---|---|---|---|---|---|
| Actual (5"): | 1 | F | 2 | F | 2 | 2 | F | F | F | 1 | 1 | F | 2 | 2 | 3 | 3 |
| Bitmap Mask(5") | = | = | = | = | = | = | = | = | = | = | z | z | z | z | z | z |
| Alg. View (5") | 1 | P | 2 | P | 2 | 2 | P | P | P | = | = | S | = | = | S | S |
| OOP Map (5") | + | = | - | = | + | + | = | = | = | = | = | = | = | = | = | = |
| Goal Map (PLAN) | 1 | 1 | 1 | 2 | 2 | 2 | 2 | 2 | 3 | 3 | F | F | F | F | F | F |

$\qquad$ U $\qquad\qquad\qquad\qquad\qquad$ U U U

The optimization will now proceed without further user activity as follows.

After Pushing out column 'c' to scratch spot '1' and performing a 2 cluster Pull into columns b and c, we have the following State(6"):

THIRD EXAMPLE AT POST-PUSH/PULL STATE (6″)

| Position | a | b | c | d | e | f | g | h | i | j | k | l | m | n | o | p |
|---|---|---|---|---|---|---|---|---|---|---|---|---|---|---|---|---|
| Actual (6″): | 1 | 1 | 1 | F | 2 | 2 | F | F | F | F | F | 2 | 2 | 2 | 3 | 3 |
| Bitmap Mask(6″) | = | = | = | = | = | = | = | = | = | = | z | z | z | z | z | z |
| Alg. View (6″) | 1 | 1 | 1 | P | 2 | 2 | P | P | P | P | S | = | = | = | S | S |
| OOP Map (6″) | + | + | + | = | + | + | = | = | = | = | = | = | = | = | = | = |
| Goal Map (PLAN) | 1 | 1 | 1 | 2 | 2 | 2 | 2 | 2 | 3 | 3 | F | F | F | F | F | F |

^___^_____V__V__^

20

After a next 2 cluster Pull into columns g and h we have following State(7″):

THIRD EXAMPLE AT POST-PULL STATE (7″)

| Position | a | b | c | d | e | f | g | h | i | j | k | l | m | n | o | p |
|---|---|---|---|---|---|---|---|---|---|---|---|---|---|---|---|---|
| Actual (7″): | 1 | 1 | 1 | F | 2 | 2 | 2 | 2 | F | F | F | 2 | F | F | 3 | 3 |
| Bitmap Mask(7″) | = | = | = | = | = | = | = | = | = | = | z | z | z | z | z | z |
| Alg. View (7″) | 1 | 1 | 1 | P | 2 | 2 | 2 | 2 | P | P | S | = | S | S | S | S |
| OOP Map (7″) | + | + | + | = | + | + | + | + | = | = | = | = | = | = | = | = |
| Goal Map (PLAN) | 1 | 1 | 1 | 2 | 2 | 2 | 2 | 2 | 3 | 3 | F | F | F | F | F | F |

^___^_____V__V

After a 1 cluster Pull from position l to column d we have following State(8″):

THIRD EXAMPLE AT POST-PULL STATE (8″)

| Position | a | b | c | d | e | f | g | h | i | j | k | l | m | n | o | p |
|---|---|---|---|---|---|---|---|---|---|---|---|---|---|---|---|---|
| Actual (8″): | 1 | 1 | 1 | 2 | 2 | 2 | 2 | 2 | F | F | F | F | F | F | 3 | 3 |
| Bitmap Mask(8″) | = | = | = | = | = | = | = | = | = | = | z | z | z | z | z | z |
| Alg. View (8″) | 1 | 1 | 1 | 2 | 2 | 2 | 2 | 2 | P | P | S | S | S | S | S | S |
| OOP Map (8″) | + | + | + | + | + | + | + | + | = | = | = | = | = | = | = | = |
| Goal Map (PLAN) | 1 | 1 | 1 | 2 | 2 | 2 | 2 | 2 | 3 | 3 | F | F | F | F | F | F |

^_____V

After yet another 2 cluster Pull from positions o–p to columns i–j we have following State(9″)

THIRD EXAMPLE AT POST-PULL STATE (9″)

| Position | a | b | c | d | e | f | g | h | i | j | k | l | m | n | o | p |
|---|---|---|---|---|---|---|---|---|---|---|---|---|---|---|---|---|
| Actual (9″): | 1 | 1 | 1 | 2 | 2 | 2 | 2 | 2 | 3 | 3 | F | F | F | F | F | F |
| Bitmap Mask(9″) | = | = | = | = | = | = | = | = | = | = | z | z | z | z | z | z |
| Alg. View (9″) | 1 | 1 | 1 | 2 | 2 | 2 | 2 | 2 | 3 | 3 | S | S | S | S | S | S |
| OOP Map (9″) | + | + | + | + | + | + | + | + | + | + | = | = | = | = | = | = |
| Goal Map (PLAN) | 1 | 1 | 1 | 2 | 2 | 2 | 2 | 2 | 3 | 3 | F | F | F | F | F | F |

^___^                                              v___v

Note that in our third example, even though some of the file data moved due to interceding user activity, none of the files ultimately changed size. Thus, the final state of the volume in illustrated STATE(9″) is exactly as laid out in the original plan or goal map.

Figure 2:
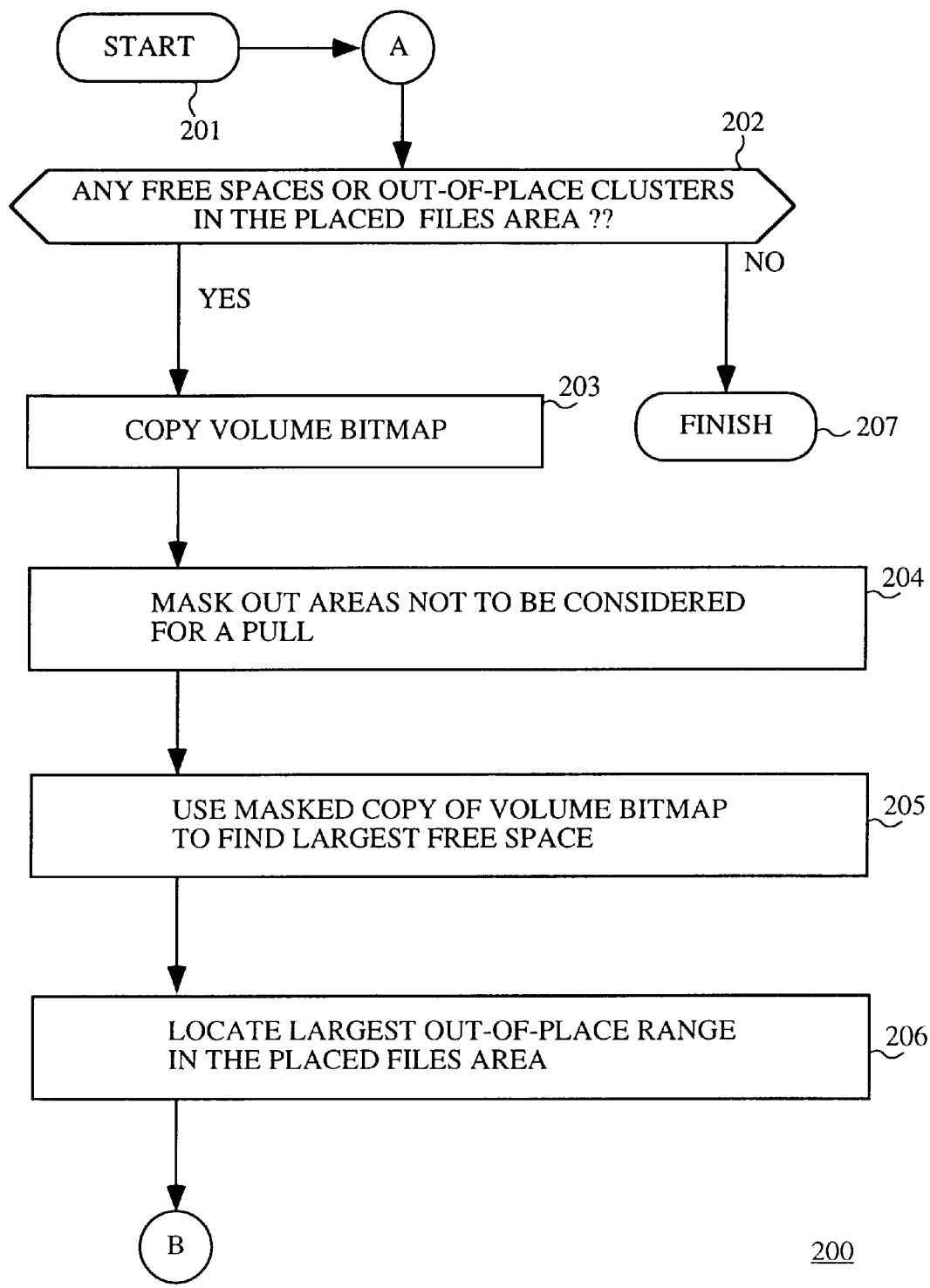
FIG. 2 illustrates a method for generating data structures usable to determine whether a pull-into-free or a push-out-to-scratch operation should be performed in the method for performing a disk optimization according to the present invention.
Figure 3:
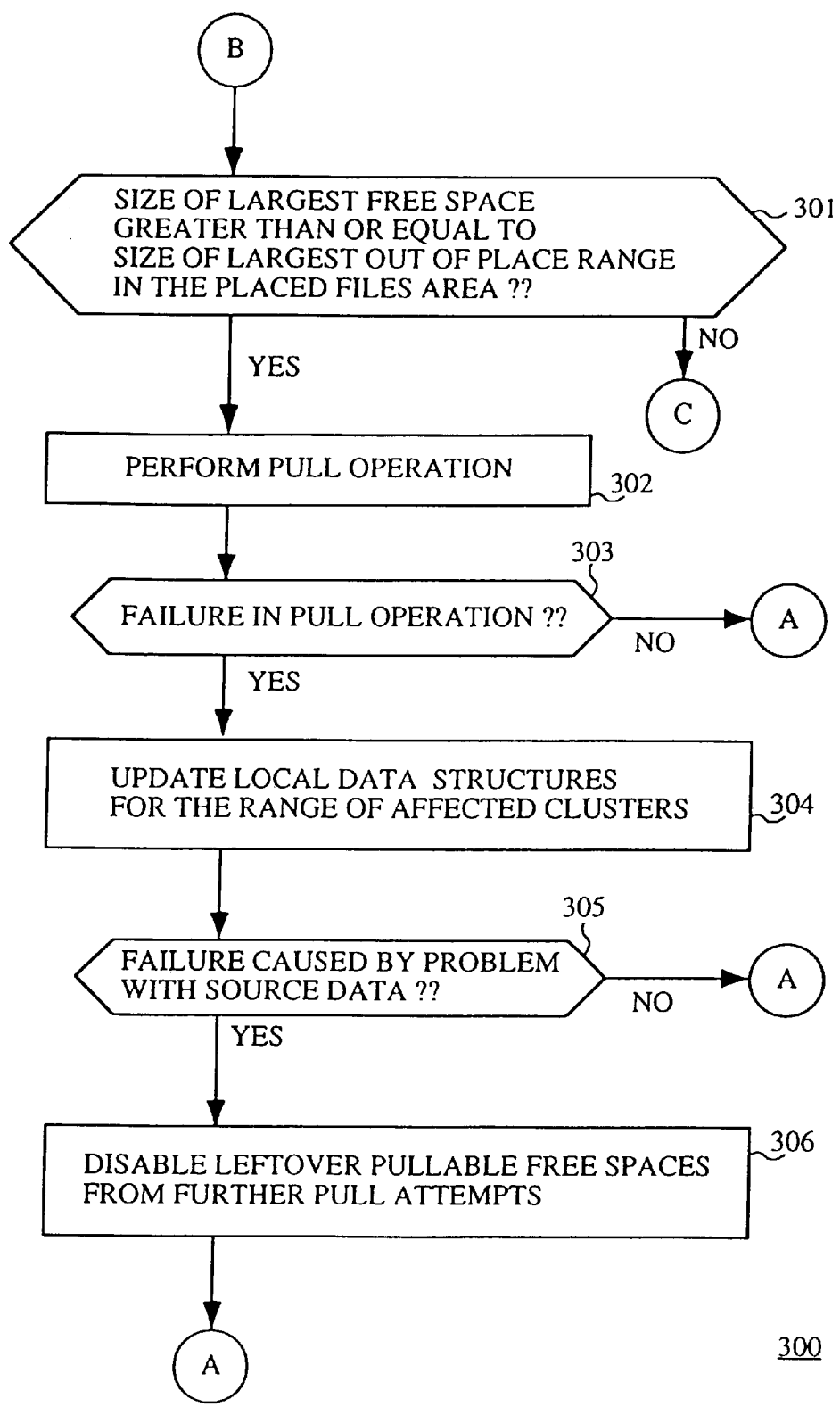
FIG. 3 illustrates a method for performing a pull operation in the method for performing a disk optimization according to the present invention.
Figure 4:
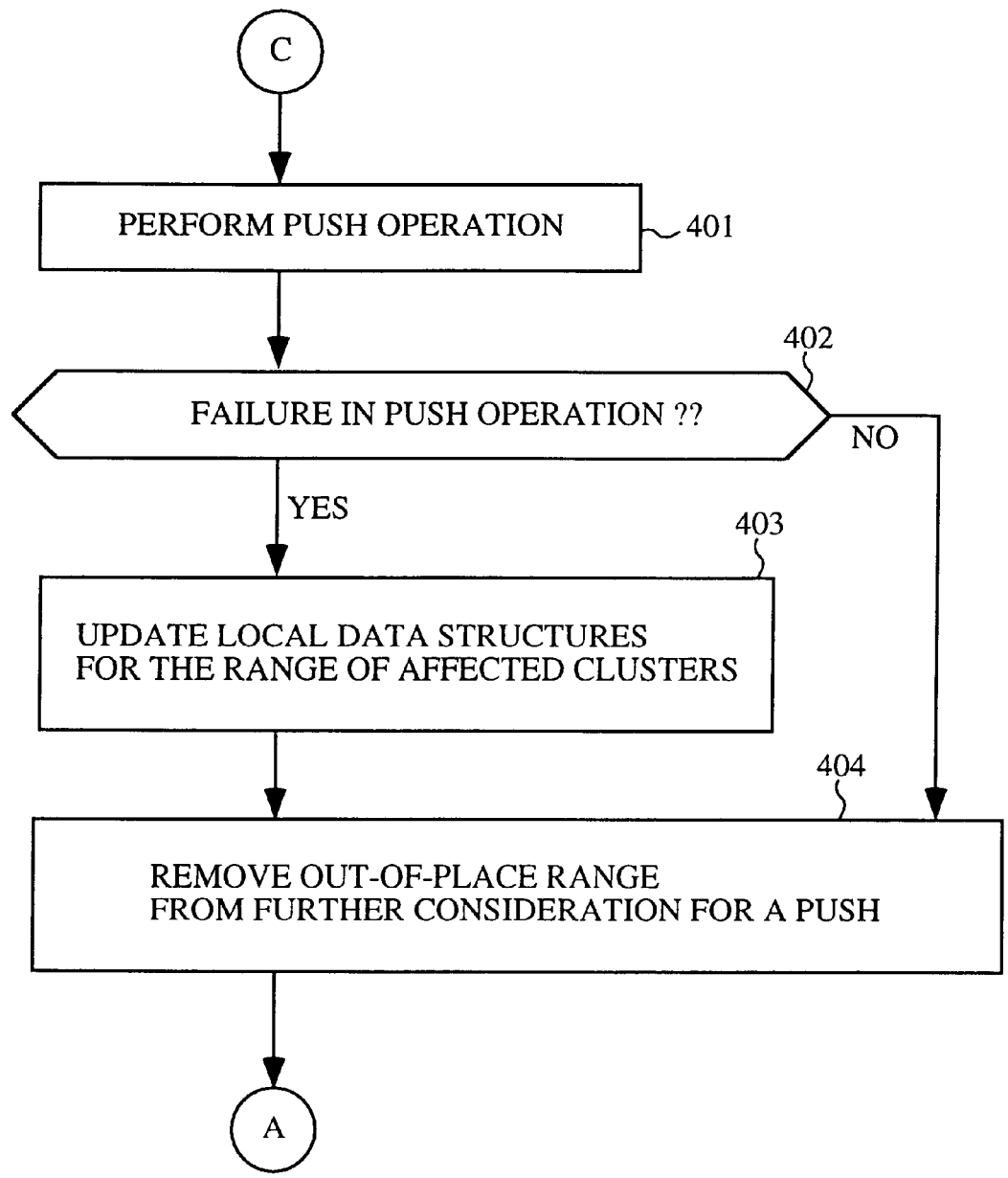
FIG. 4 illustrates a method for performing a push operation in the method for performing a disk optimization according to the present invention.

The above examples and iterations are performed using the presently preferred embodiment of the method according to the present invention, which is illustrated in FIGS. 2 through 4.

FIG. 2 illustrates a method 200 for generating data structures needed to determine whether a pull or a push operation should be performed in the method for performing a disk optimization according to the present invention. The optimization phase begins at step 201. At step 202, the method checks to see whether or not there are any free spaces or out-of-place clusters in the placed files area. If no more free spaces or out-of-place clusters exist, then the method is finished at step 207. However, if more free spaces or out-of-place clusters exist, then a copy of the volume bitmap is made at step 203. At step 204, the method masks out the free areas not to be considered for a pull operation. At step 205, the method uses the masked copy of the volume bitmap to find the largest, Pullable-into, free space. At step 207, the method locates the largest out-of-place range in the placed files area.

FIG. 3 illustrates a method 300 for performing a pull operation in the method for performing a disk optimization according to the present invention. Following step 206, the size of largest, Pullable-into, free space is compared to the size of the largest out-of-place range of clusters in the placed files area. If the largest such free space is at least the size of the largest out of place range of clusters, then a pull operation is attempted at step 302. Test 303 determines if a failure occurs in the pull operation. If the pull operation completed successfully, then the method returns to test step 202. If a failure occurs in the pull operation, then local data structures are updated for the range of affected clusters at step 304. Test 305 determines if a failure has occurred in the pull operation caused by a problem with the corresponding source data. If there was a problem with the source data, the leftover (unfulifilled) pullable free spaces are disabled from further attempts at step 306, otherwise the method returns to test step 202.

FIG. 4 illustrates a method 400 for performing a push operation in the method for performing a disk optimization according to the present invention. If the largest free space is less than the size of the largest out of place range of clusters, then step 401 follows test 301. At step 401, a push operation is attempted. Test 402 determines if there is a failure in the push operation. If a failure in the push operation occurred, then step 403 updates the local data structures for the range of affected clusters. The out-of-place range of clusters in the placed-files-region is removed from further consideration for a push at step 404, before the method returns to step 202.

Brands and products referenced herein are the trademarks or registered trademarks of their respective holders.

Although the present invention has been described in its presently preferred embodiment, that embodiment is offered by way of example, not by way of limitation. It is to be understood that various additions and modifications can be made without departing from the spirit and scope of the present invention. Accordingly, all such additions and modifications are deemed to lie with the spirit and scope of the present invention as set out in the appended claims.

What is claimed is:

1. A machine-implemented method of trying to place into allocatable and re-allocatable storage units of a file storage system, file data according to a composed placement plan,
   where at various times, various ones of the storage units may contain file data that is out-of-place under the placement plan and various others of the storage units may be locally considered by the data-placing method as free space into which file data may be placed; and
   where between steps of the data-placing method, interceding activity can alter contents and allocations of the storage units of the file storage system;
   the data-placing method comprising:
   (a) first determining if a size of a currently and locally-designated, largest free space, into which locally designated-as-largest free space said plan plans to place corresponding file data, is equal to or greater than a size of a currently and locally-designated, largest out-of-place span of file data, where said locally designated-as-largest out-of-place span is within a placed files area, into which said plan plans to place other file data;
   (b) in response to the first determining step (a) affirming said equal to or greater condition, attempting a first pull operation which tries to pull into the locally designated-as-largest free space, the locally designated-as-largest out-of-place span of file data;
   (c) second determining if a part of the attempted first pull operation encountered a failure;

(d) in response to detection of a pull failure by the second determining step (c), updating local designating structures to indicate at least one of which storage unit that was previously designated-locally as being free space was intercedingly filled, and which storage unit that was previously designated-locally as containing out-of-place file data was intercedingly erased or overwritten with data of a different file;

(d.1) in further response to detection of the pull failure by the second determining step (c), third determining if the attempted first pull operation failed because source data, called for by the attempted first pull operation, per the plan, was unavailable; and (e) in response to said third determining step (d.1) determining that the pull failure was due to the unavailability of called-for source data, disabling from participation in further pull attempts per the current plan, the leftover free space into which the unavailable source data was to be pulled per the current plan.

2. A data-placing method as in claim 1, further comprising:

(f) in response to the first determining step (a) disaffirming said equal to or greater condition, attempting a first push operation which tries to push the currently and locally-designated, largest out-of-place span of file data to a scratch area;

(g) third determining if a part of the attempted first push operation encountered a failure; and (h) in response to detection of a push failure by the third determining step (g), updating the local designating structures to indicate at least one of which storage unit that was previously designated-locally as being scratch area was intercedingly filled, and which storage unit that was previously designated-locally as containing out-of-place file data was intercedingly erased or overwritten with data of a different file.

3. A data-placing method as in claim 2, further comprising:

(h.1) in further response to detection of the push failure by the third determining step (g), removing from participation in further push attempts per the current plan, the out-of-place storage unit that was previously designated-locally as containing out-of-place file data and for which the attempted first push failed.

4. A data-placing method as in claim 1, further comprising:

(f) prior to the first determining step (a) making a local copy of a current operating system view of which storage units are free and which are filled with data of what file; and (a.1) in said first determining step (a) making use of the local copy of the operating system view to determine the size of the currently and locally-designated, largest free space.

5. A data-placing method as in claim 4, wherein the step of using the local copy of the operating system view includes:

(a.1a) masking out areas of the local copy not to be considered for pull operations; and (a.1b) using the masked local copy to find the largest free space.

6. A data-placing method as in claim 1, wherein said first determining step (a) includes:

(a.1) forming and examining an out-of-place map to locate the largest out-of-place span of file data.

7. A data-placing method as in claim 2, wherein the pull and push attempting operations steps are repeatedly performed until no locally-designated as pullable-into, free spaces remain or locally-designated as pushable and out-of-place spans of file data remain.

8. A computer readable storage medium comprising:

computer readable program code embodied on said computer readable storage medium, said computer readable program code for programming a computer to perform a method for optimizing a volume on a disk, the method comprising the steps of:

if a size of a largest free space is at least a size of a largest out-of-place range in a placed files area, attempting a pull operation;

if a part of the pull operation fails, updating local data structures for a range of affected clusters; and if the pull operation failed because of a problem with source data, disabling leftover pullable free space from further pull attempts.

9. A computer readable storage medium as in claim 8, the method further comprising the step of:

if the size of a largest free space is less than the size of the largest out-of-place range in the placed files area, attempting a push operation; and if a part of the push operation fails, updating the local data structures for the range of affected clusters.

10. A computer readable storage medium as in claim 9, the method further comprising the step of:

removing the out-of-place range from further consideration for a push operation.

11. A computer readable storage medium as in claim 8, the method further comprising the step of:

prior to the attempting step, making a copy of the volume bitmap; and using the volume bitmap to determine the largest free space in the placed files area.

12. A computer readable storage medium as in claim 11, wherein the step of using the volume bitmap to determine the largest free space in the placed files area comprises the steps of:

masking out areas of the volume bitmap not to be considered for pull operations; and using a masked copy of the volume bitmap to find the largest free space in the placed files area.

13. A computer readable storage medium as in claim 8, the method further comprising the step of:

examining an out-of-place map to locate the largest out-of-place range in the placed files area.

14. A computer readable storage medium as in claim 9, wherein the attempting steps are repeatedly performed until no free spaces or out-of-place clusters in the placed files area remain.

15. A computer system, comprising:

a processor; and a processor readable storage medium coupled to the processor, said processor readable storage medium having embodied thereon processor readable program code, said computer readable program code for programming the computer system to perform a method for optimizing a volume on a disk, the method comprising the steps of:

if a size of a largest free space is at least a size of a largest out-of-place range in a placed files area, attempting a pull operation;

if a part of the pull operation fails, updating local data structures for a range of affected clusters; and if the pull operation failed because of a problem with source data, disabling leftover pullable free space from further pull attempts.

16. A computer system as in claim 15, wherein the method further comprises the steps of:

if the size of a largest free space is less than the size of the largest out-of-place range in the placed files area, attempting a push operation; and if a part of the push operation fails, updating the local data structures for the range of affected clusters.

17. A computer system as in claim 16, the method further comprising the step of:

removing the out-of-place range from further consideration for a push operation.

18. A computer system as in claim 15, wherein the method further comprises the step of:

prior to the attempting step, making a copy of the volume bitmap; and using the volume bitmap to determine the largest free space in the placed files area.

19. A computer system as in claim 18, wherein the step of using the volume bitmap to determine the largest free space in the placed files area comprises the steps of:

masking out areas of the volume bitmap not to be considered for pull operations; and using a masked copy of the volume bitmap to find the largest free space in the placed files area.

20. A computer system as in claim 15, the method further comprising the step of:

examining an out-of-place map to locate the largest out-of-place range in the placed files area.

21. A computer system as in claim 16, wherein the attempting steps are repeatedly performed until no free spaces or out-of-place clusters in the placed files area remain.

22. A machine-implemented method for attempting to implement a first placement plan for placing file data in respective, allocatable or re-allocatable storage units of a file storage system, wherein during a run of attempted placing of the file data, per a run-associated plan, interceding activity can alter contents or the allocation status of the storage units of the file storage system;

the plan implementation attempting method comprising:

(a) attempting to pull into respective ones of what are locally designated as non-allocated, and pullable-into, ones of the storage units (pullable-into free spaces), the file data of storage units that are locally designated as containing such file data, where such file data is indicated by the run-associated, placement plan to ultimately belong in the respective ones of the pullable-into free spaces;

(b) first determining if the respective ones of the pullable-into free spaces were successfully filled by the attempted pulling and in accordance with the run-associated, placement plan with the correspondingly belonging file data;

(c) if the first determining step (b) determines that an attempted pull failed for a respective pullable-into free space, indicating that the respective free space should no longer be designated as being pullable-into for the remainder of the plan implementation attempting run; and (d) if the first determining step (b) determines that an attempted pull failed because of a problem with source data, disabling leftover pullable free space from further pull attempts.

23. The plan implementation attempting method of claim 22, and further comprising:

(e) second determining if the first placement plan was prevented from being fully realized in a corresponding first run that includes steps (a) through (d);

(f) if the second determining step (e) determines that the first placement plan was not fully realized, composing a second placement plan for placing file data in respective, storage units of the file storage system; and performing a second plan implementation attempting run that uses the second placement plan as its run-associated, placement plan, where the second run includes said steps (a) through (d).

24. The plan implementation attempting method of claim 23 wherein the first and second placement plans seek to produce respective first and second defragmentations of files of the file storage system.

25. The plan implementation attempting method of claim 22 and further comprising:

(e) attempting to push into a scratch space of the file storage system, the data of respective ones of what are locally designated as allocated, and pushable-to-scratch, ones of the storage units, where such pushable-to-scratch units are further locally designated as containing out-of-place file data (pushable and out-of-place data), where such out-of-place file data is indicated by the run-associated, placement plan to ultimately belong in different ones of the storage units than the storage units that are locally indicated to hold such out-of-place file data;

(f) second determining if the pushable and out-of-place data of respective ones of the out-of-place holding units were successfully moved by the attempted pushing and according to the run-associated, placement plan to the correspondingly belonging storage units; and (g) the second determining step (f) determines that an attempted push failed for a respective out-of-place holding unit, indicating that the respective out-of-place holding unit should no longer be designated as holding pushable and out-of-place data for the remainder of the plan implementation attempting run.

26. The plan implementation attempting method of claim 25 and further comprising:

(h) third determining if the first placement plan was prevented from being fully realized in a corresponding first run that includes steps (a) through (e);

(i) if the third determining step (h) determines that the first placement plan was not fully realized, composing a second placement plan for placing file data in respective, storage units of the file storage system; and performing a second plan implementation attempting run that uses the second placement plan as its run-associated, placement plan, where the second run includes said steps (a) through (e).

27. The plan implementation attempting method of claim 25 wherein the first placement plan results in a respective first defragmentation of at least some files of the file storage system.

28. The plan implementation attempting method of claim 22 wherein the file storage system is coupled to a network and said interceding activity for altering contents or the allocation status of the storage units come by way of server requests made through the network for file managing services provided by the file storage system.

29. A machine-implemented method for attempting to implement a first placement plan for placing file data in respective, allocatable or re-allocatable storage units of a file storage system,
wherein during a run of attempted placing of the file data, per a run-associated plan,
interceding activity can alter contents or the allocation status of the storage units of the file storage system;
the plan implementation attempting method comprising:
(a) attempting to push into a scratch space of the file storage system, the data of respective ones of what are locally designated as allocated, and pushable-to-scratch, ones of the storage units, where such pushable-to-scratch units are further locally designated as containing out-of-place file data (pushable and out-of-place data), where such out-of-place file data is indicated by the run-associated, placement plan to ultimately belong in different ones of the storage units than the storage units that are locally indicated to hold such out-of-place file data;
(b) first determining if the pushable and out-of-place data of respective ones of the out-of-place holding units were successfully moved by the attempted pushing and according to the run-associated, placement plan to the correspondingly belonging storage units; and
(c) if the first determining step (b) determines that an attempted push failed for a respective out-of-place holding unit, indicating that the respective out-of-place holding unit should no longer be designated as holding pushable and out-of-place data for the remainder of the plan implementation attempting run.

30. The plan implementation attempting method of claim 29 and further comprising:
(d) second determining if the first placement plan was prevented from being fully realized in a corresponding first run that includes steps (a) through (c);
(e) if the second determining step (d) determines that the first placement plan was not fully realized, composing a second placement plan for placing file data in respective, storage units of the file storage system; and performing a second plan implementation attempting run that uses the second placement plan as its run-associated, placement plan, where the second run includes said steps (a) through (c).

31. The plan implementation attempting method of claim 30 wherein the first and second placement plans seek to produce respective first and second defragmentations of files of the file storage system.

32. An instructing device configured to cause an instructable machine to carry out a process of attempting to implement a first placement plan for placing file data in respective, allocatable or re-allocatable storage units of a file storage system,
wherein during a run of attempted placing of the file data, per a run-associated plan, interceding activity can alter contents or the allocation status of the storage units of the file storage system;
and where the plan implementation attempting process comprises:
(a) attempting to pull into respective ones of what are locally designated as non-allocated, and pullable-into, ones of the storage units (pullable-into free spaces), the file data of storage units that are locally designated as containing such file data, where such file data is indicated by the run-associated, placement plan to ultimately belong in the respective ones of the pullable-into free spaces;
(b) first determining if the respective ones of the pullable-into free spaces were successfully filled by the attempted pulling and in accordance with the run-associated, placement plan with the correspondingly belonging file data;
(c) if the first determining step (b) determines that an attempted pull failed for a respective pullable-into free space, indicating that the respective free space should no longer be designated as being pullable-into for the remainder of the plan implementation attempting run; and
(d) if the first determining step (b) determines that an attempted pull failed because of a problem with source data, disabling leftover pullable free space from further pull attempts.

33. The instructing device of claim 32 wherein said plan implementation attempting process further comprises:
(e) second determining if the first placement plan was prevented from being fully realized in a corresponding first run that includes steps (a) through (d);
(f) if the second determining step (e) determines that the first placement plan was not fully realized, composing a second placement plan for placing file data in respective, storage units of the file storage system; and performing a second plan implementation attempting run that uses the second placement plan as its run-associated, placement plan, where the second run includes said steps (a) through (d).

34. The instructing device of claim 33 wherein the first and second placement plans seek to produce respective first and second defragmentations of files of the file storage system.

35. The instructing device of claim 32 wherein said plan implementation attempting process further comprises:
(e) attempting to push into a scratch space of the file storage system, the data of respective ones of what are locally designated as allocated, and pushable-to-scratch, ones of the storage units, where such pushable-to-scratch units are further locally designated as containing out-of-place file data (pushable and out-of-place data), where such out-of-place file data is indicated by the run-associated, placement plan to ultimately belong in different ones of the storage units than the storage units that are locally indicated to hold such out-of-place file data;
(f) second determining if the pushable and out-of-place data of respective ones of the out-of-place holding units were successfully moved by the attempted pushing and according to the run-associated, placement plan to the correspondingly belonging storage units; and
(g) if the second determining step (f) determines that an attempted push failed for a respective out-of-place holding unit, indicating that the respective out-of-place holding unit should no longer be designated as holding pushable and out-of-place data for the remainder of the plan implementation attempting run.

36. The instructing device of claim 35 wherein said plan implementation attempting process further comprises:
(h) third determining if the first placement plan was prevented from being fully realized in a corresponding first run that includes steps (a) through (e);
(i) if the third determining step (h) determines that the first placement plan was not fully realized, composing a second placement plan for placing file data in respective, storage units of the file storage system; and performing a second plan implementation attempting run that uses the second placement plan as its run-associated, placement plan, where the second run includes said steps (a) through (e).

37. A file reorganizing machine having a processor configured to carry out a process of attempting to implement at least a first placement plan for placing file data in respective, allocatable or re-allocatable storage units of a file storage system coupled to said file reorganizing machine, wherein during a run of attempted placing of the file data, per a run-associated plan, interceding activity can alter contents or the allocation status of the storage units of the file storage system;

and where the plan implementation attempting process comprises:

(a) attempting to pull into respective ones of what are locally designated as non-allocated, and pullable-into, ones of the storage units (pullable-into free spaces), the file data of storage units that are locally designated as containing such file data, where such file data is indicated by the run-associated, placement plan to ultimately belong in the respective ones of the pullable-into free spaces;

(b) first determining if the respective ones of the pullable-into free spaces were successfully filled by the attempted pulling and in accordance with the run-associated, placement plan with the correspondingly belonging file data; and (c) if the first determining step (b) determines that an attempted pull failed for a respective pullable-into free space, indicating that the respective free space should no longer be designated as being pullable-into for the remainder of the plan implementation attempting run; and (d) if the first determining step (b) determines that an attempted pull failed because of a problem with source data, disabling leftover pullable free space from further pull attempts.

38. The file reorganizing machine of claim 37 and further having a network interface for coupling to a network, wherein said interceding activity for altering contents or the allocation status of the storage units can come by way of server requests made through the network for file managing services provided by the file storage system.

* * * * *